(12) United States Patent
Fukuda

(10) Patent No.: US 8,616,653 B2
(45) Date of Patent: Dec. 31, 2013

(54) FRAME STRUCTURE OF SEAT CUSHION FOR VEHICLE SEAT

(75) Inventor: Tomokazu Fukuda, Toyota (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 273 days.

(21) Appl. No.: 12/682,053

(22) PCT Filed: Jul. 16, 2008

(86) PCT No.: PCT/JP2008/062820
§ 371 (c)(1),
(2), (4) Date: Jul. 8, 2010

(87) PCT Pub. No.: WO2009/069339
PCT Pub. Date: Jun. 4, 2009

(65) Prior Publication Data
US 2010/0264717 A1    Oct. 21, 2010

(30) Foreign Application Priority Data

Nov. 29, 2007   (JP) .................................. 2007-308679

(51) Int. Cl.
*A47C 7/02*   (2006.01)
(52) U.S. Cl.
USPC .................................. 297/452.2; 297/452.18
(58) Field of Classification Search
USPC ..................... 297/452.18, 452.2, 452.1, 463.2
See application file for complete search history.

(56) References Cited

U.S. PATENT DOCUMENTS

| | | | |
|---|---|---|---|
| 2,865,436 A | | 12/1958 | Thorne |
| 3,147,036 A | | 9/1964 | McRae |
| 3,926,474 A | | 12/1975 | Johndrow et al. |
| 4,152,024 A | | 5/1979 | Farelli |
| 4,850,644 A | | 7/1989 | Kazaoka et al. |
| 5,626,395 A | * | 5/1997 | Aufrere ................... 297/452.18 |
| 6,220,669 B1 | * | 4/2001 | Frohnhaus et al. ...... 297/452.18 |
| 6,361,115 B1 | * | 3/2002 | Aufrere et al. ........... 297/452.18 |
| 6,405,987 B1 | * | 6/2002 | Andrigo et al. ............... 248/429 |
| 2006/0108491 A1 | * | 5/2006 | Behrens ........................ 248/429 |
| 2006/0273649 A1 | * | 12/2006 | Saberan .................. 297/452.18 |
| 2007/0182226 A1 | | 8/2007 | Sakuma et al. |
| 2009/0167073 A1 | | 7/2009 | Fujieda |
| 2009/0179477 A1 | | 7/2009 | Yamazaki et al. |

(Continued)

FOREIGN PATENT DOCUMENTS

| | | |
|---|---|---|
| DE | 2754022 | 6/1978 |
| DE | 4315521 | 5/1994 |

(Continued)

OTHER PUBLICATIONS

Japan Official Action, mail date is Jan. 8, 2013 and English translation thereof.

*Primary Examiner* — Philip Gabler
(74) *Attorney, Agent, or Firm* — Greenblum & Bernstein, P.L.C.

(57) ABSTRACT

A frame structure of a seat cushion can include a right and left plate-like side panel having side portions of the seat cushion, and a tubular front pipe reinforcing front side portions of the right and left side panels. The front pipe can include right and left erect portions extending over the length of front sides of the side panels, right and left extending portions extending forward from upper end portions of the right and left erect portions, and a bridge portion bridging across front end portions of the right and left extending portions.

19 Claims, 3 Drawing Sheets

(56) References Cited

U.S. PATENT DOCUMENTS

| | | |
|---|---|---|
| 2009/0294259 A1 | 12/2009 | Kuno et al. |
| 2010/0102599 A1 | 4/2010 | Itou et al. |
| 2010/0109404 A1 | 5/2010 | Yamagishi et al. |
| 2010/0140989 A1 | 6/2010 | Otsuka |

FOREIGN PATENT DOCUMENTS

| | | |
|---|---|---|
| DE | 69304837 | 2/1997 |
| DE | 10044725 | 3/2002 |
| FR | 2521411 | 8/1983 |
| FR | 2736310 | 1/1997 |
| FR | 2861659 | 5/2005 |
| FR | 2861660 | 5/2005 |
| JP | 62-74394 | 4/1987 |
| JP | 5-1345 | 1/1993 |
| JP | 6-59128 | 8/1994 |
| JP | 2000-233674 | 8/2000 |
| JP | 2002-119377 | 4/2002 |
| JP | 2005-119325 | 5/2005 |
| JP | 2007-212196 | 8/2007 |

\* cited by examiner

FRAME STRUCTURE OF SEAT CUSHION FOR VEHICLE SEAT

TECHNICAL FIELD

The present invention relates to a frame structure of a seat cushion for a vehicle seat.

BACKGROUND ART

Generally speaking, a vehicle seat has a seat cushion, and a seat back mounted to the rear portion of the seat cushion. Each of the seat cushion and the seat back is mainly composed of a frame structure and a pad attached to the frame structure. The frame structure of the seat cushion has, for example, right and left panel portions and a front panel portion that are formed, for example, of plate materials (See JP 2007-212196 A).

However, since the front panel portion must be strong enough to withstand a shock at the time of collision or the like of the vehicle, it is necessary to perform drawing or bending on the plate material thereof to achieve an enhancement in strength. This involves a rather high cost. Therefore, there is a need in the art to provide a frame structure of a seat cushion for a vehicle seat which is of high strength and which can be formed at low cost.

SUMMARY

According to one aspect of the present invention, a vehicle seat has right and left plate-like side panels constituting the side portions of a seat cushion, and a tubular front pipe reinforcing the front side portions of the right and left side panels. And, the front pipe has right and left erect portions extending substantially over the entire length of the front sides of the side panels, right and left extending portions extending forward from the upper end portions of the right and left erect portions, and a bridge portion bridging across the front end portions of the right and left extending portions.

According to this aspect, due to its tubular configuration, the front pipe is stronger than the conventional plate-like member. Further, drawing or the like, which is necessary in the case of the plate-like member, is not required, so that it can be formed at low cost. When the vehicle undergoes collision (forward collision), and the front portion of the seat receives a large downward force due to the weight of the occupant or the like, the front pipe transmits the force in the following order: the bridge portion, the extending portions, and the erect portions. And, since the erect portions extend substantially over the entire length of the front sides of the side panels, the above-mentioned force can be reliably received by the erect portions. Further, when the frame structure receives a force sidewise, it can efficiently receive and withstand the force due to the bridge portion of the front pipe. Further, since the side panels are of a plate-like configuration, seat components such as switches can be easily attached thereto.

According to another aspect of the present invention, a horizontally extending rod is mounted between the front portions of the right and left side panels. And, the erect portion of the front pipe is adjacent to the front side of the rod. Due to this aspect, when the front pipe receives a force from the front to the rear side, the erect portion of the front pipe and the force can be received by the rod. Thus, through cooperation of the front pipe and the rod, the strength of the frame structure is enhanced.

Still another aspect of the present invention is that, between a front lower portion of the side panel and a lower portion of the erect portion of the front pipe, there is provided a connection member connecting them to each other. The connection member includes a protruding portion protruding forwards from the lower portion of the erect portion. Thus, due to this aspect, the erect portion of the front pipe can be reliably connected to the side panel by means of the connection member. Further, forward movement of the lower portion of the erect portion of the front pipe is regulated by the protruding portion of the connection member. Thus, the erect portion is not easily detachable with respect to the side panel.

BEST MODE FOR CARRYING OUT THE INVENTION

Figure 1:
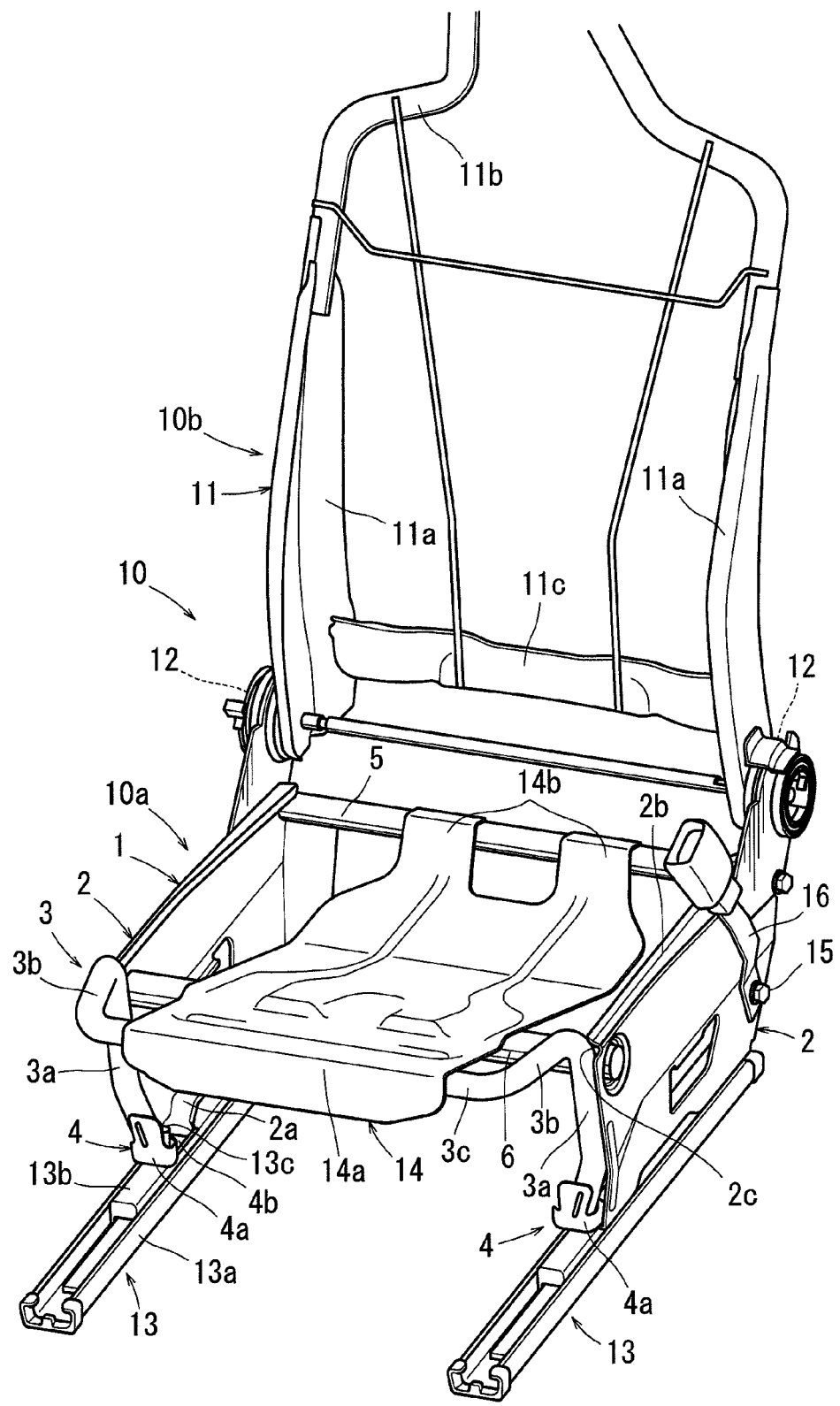
FIG. 1 is a perspective view of a frame structure of a vehicle seat.
Figure 2:
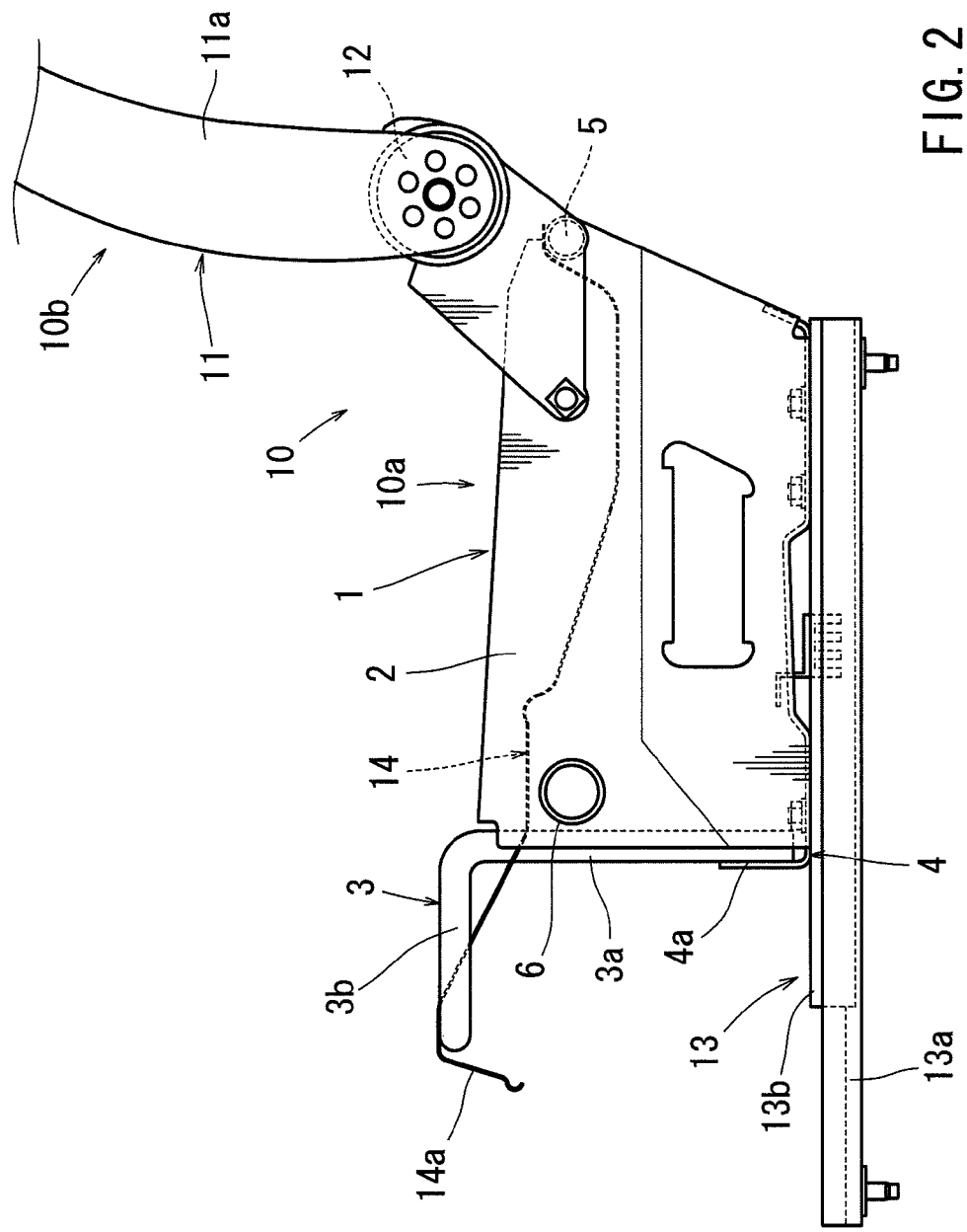
FIG. 2 is a side view of the frame structure of the vehicle seat.

An embodiment of the present invention will be described with reference to FIGS. 1 to 3. As shown in FIGS. 1 and 2, a seat 10 is a seat of a vehicular such as an automobile, and has a seat cushion 10a, a seat back 10b, and slide devices 13. The seat cushion 10a and the seat back 10b are mainly composed of frame structures 1 and 11, and pads (not shown) attached to the frame structures 1 and 11.

Figure 3:
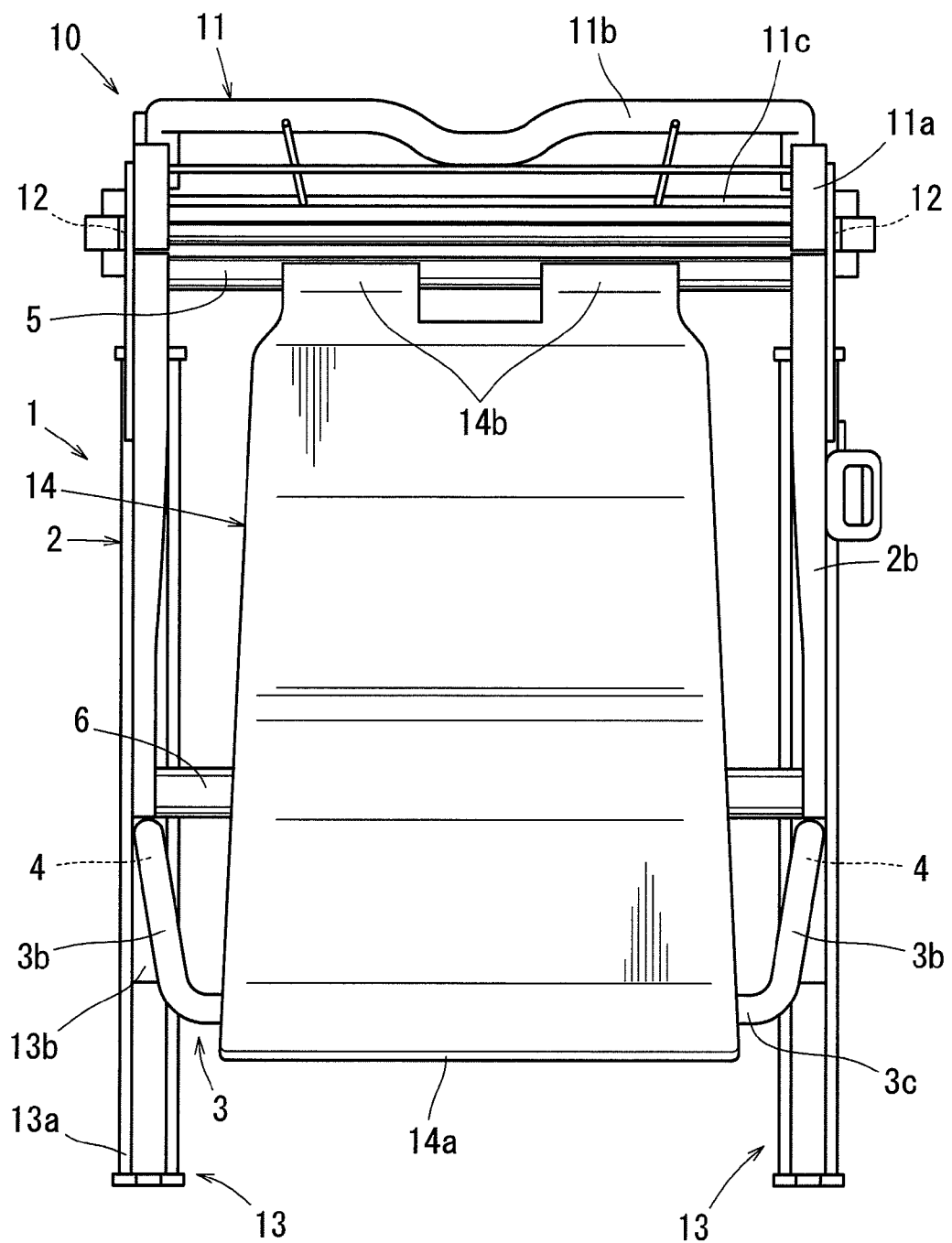
FIG. 3 is a top view of the frame structure of the vehicle seat.

As shown in FIGS. 1 to 3, the frame structure 11 of the seat back 10b has right and left side plate-like side frames 11a, and a tubular upper pipe 11b connecting the upper end portions of the side frames 11a to each other. Between the lower portions of the side frames 11a, there is mounted a reinforcing plate 11c connecting and reinforcing them. The lower portions of the side frames 11a are connected to the frame structure 1 of the seat cushion 10a by reclining devices 12 so as to allow angular adjustment.

The frame structure 1 of the seat cushion 10a has right and left plate-like side panels 2, and a tubular front pipe 3 connecting the front portions of the right and left side panels 2 to each other. Each of the side panels 2 consists of a single component in the form of a single plate, constituting a side wall portion of the seat cushion 10a. Lower end portions 2a of the side panels 2 are bent toward the center of the seat 10, and are mounted to the slide devices 13.

Mounted to the rear upper portions of the right and left panels 2 is a rear side reinforcing rod 5 connecting and reinforcing them. Mounted to the front upper portions of the right and left side panels 2 is a front side reinforcing rod 6 connecting and reinforcing them. An anchor 15 is mounted to the lower portion of the side surface of the side panel 2 situated on the vehicular center side, and a seat belt 16 is attached to the anchor 15. Flanges 2b protruding toward the center of the seat 10 are formed on the upper sides of the side panels 2. The front end portions of the side panels 2 have no flanges or the like and are of a simple construction substantially consisting of flat surfaces. In the front portions of the flanges 2b, there are formed openings 2c where the front pipe 3 is installed.

The front pipe 3 is consisted of a tubular pipe, and integrally comprises a pair of erect portions 3a, a pair of extending portions 3b, and a bridge portion 3c. The erect portions 3a are on the front side of the side panels 2 and on the seat 10 center side of the side panels 2. The erect portions 3a extend along the front sides of the side panels 2 over substantially the entire length of the front sides. The upper portions of the erect portions 3a extend through the openings 2c of the side panels 2, and protrude above the side panels 2. The erect portions 3a are attached to the side panels 2 by welding or the like, and are at the front side of and adjacent to the front side reinforcing rod 6 with slight gaps therebetween.

The extending portions 3b extend forwards from the upper end portions of the erect portions 3a, extending on the front side of the side panels 2. The bridge portion 3c extends horizontally so as to connect the front end portions of the right and left extending portions 3b. An elastic support body 14 is attached to the upper side of the bridge portion 3c and of the rear side reinforcing rod 5. The elastic support body 14 is formed of a metal plate material capable of elastic deformation. Formed at the front side portion of the elastic support body 14 is a front latching portion 14a to be latched on the bridge portion 3c. Formed at the rear side portion of the elastic support body 14 are a pair of rear latching portions 14b to be latched on the rear side reinforcing rod 5. A pad (not shown) is installed on the elastic support body 14, and the pad is elastically retained from below by the elastic support body 14.

Between the lower portions of the erect portions 3a and the front lower portions of the side panels 2, there are mounted connection members 4 connecting them to each other. Each connection member 4 has a base portion 4b and a protruding portion 4a provided so as to be erect at the front end of the base portion 4b. The base portions 4b are mounted to the front lower portions of the side panels 2, more specifically, to the front upper surfaces of the lower end portions 2a, by welding or the like. And, the lower portions of the erect portions 3a are mounted to the base portions 4b and the protruding portions 4a by welding or the like. The protruding portions 4a protrude on the front side of the lower portions of the erect portions 3a. Thus, due to the protruding portions 4a, the lower portions of the erect portions 3a can be prevented from being detached from the side panel 2 sides.

The slide devices 13 are devices supporting the seat 10 so as to allow it to slide longitudinally with respect to the floor, and have lower rails 13a and upper rails 13b. The lower rails 13a are mounted to the floor. The upper rails 13b are slidably mounted to the lower rails 13a. Protrusions 13c are formed on the front portions of the upper surfaces of the upper rails 13b. The protrusions 13c are passed through through-holes formed in the lower end portions 2a of the side panels 2 and through through-holes formed in the base portions 4b of the connection members 4. And, the lower end portions 2a of the side panels 2 are mounted to the upper surfaces of the upper rails 13b by welding or the like.

Mounted to the side panels 2 are seat components (not shown), such as an operating lever and a switch, which are operated when adjusting the seat attitude and the seat position.

As described above, the frame structure 1 has the right and left plate-like side panels 2, and the tubular front pipe 3. And, the front pipe 3 has the right and left erect portions 3a, the right and left extending portions 3b, and the bridge portion 3c.

Thus, due to its tubular configuration, the front pipe 3 has a higher strength than the conventional plate-like member. Further, unlike the plate-like member, it requires no drawing processing or the like, so that it can be formed at low cost. When the vehicular undergoes collision (forward collision) and the front portion thereof receives a large downward force due to the weight of the occupant or the like, the front pipe 3 transmits the force in the following order: the bridge portion 3c, the extending portions 3b, and the erect portions 3a. And, since the erect portions 3a extend substantially over the entire length of the front sides of the side panels 2, the above-mentioned force can be reliably received by the erect portions 3a. Further, when a force is applied to it sidewise, the frame structure 1 can efficiently receive and withstand the force by virtue of the bridge portion 3c of the front pipe 3. Further, due to their plate-like configuration, the side panels 2 easily allow attachment of seat components such as switches.

The front side reinforcing rod 6 is mounted between the front portions of the right and left side panels 2. And, the erect portions 3a of the front pipe 3 are adjacent to the front side of the front side reinforcing rod 6. Thus, when a force from the front toward the rear side is applied to the front pipe 3, the erect portions 3a of the front pipe 3 and the force can be receive by virtue of the front side reinforcing rod 6. Thus, through cooperation of the front pipe 3 and the front side reinforcing rod 6, the strength of the frame structure 1 is enhanced.

Between the side panels 2 and the erect portions 3a of the front pipe 3, there are provided the connection members 4 connecting them to each other. The connection members 4 have the protruding portions 4a protruding on the front side of the lower portions of the erect portions 3a. Thus, the erect portions 3a of the front pipe 3 can be reliably connected to the side panels 2 by virtue of the connection members 4. Further, forward movement of the lower portions of the erect portions 3a of the front pipe 3 is regulated by the protruding portions 4a of the connection members 4. Thus, the erect portions 3a are not easily detachable with respect to the side panels 2.

Further, each side panel 2 is formed as a single component in the form of a single plate. Thus, as compared with a structure composed of a plurality of members, the requisite number of fastening operations using rivets or the like is reduced. Thus, the side panels can be formed at lower cost. Further, the front pipe 3 has the extending portions 3b extending on the front side of the side panels 2. Thus, the longitudinal length of the side panels 2 can be reduced by an amount corresponding to the length of the extending portions 3b.

The present invention is not restricted to the above configuration but allows adoption of the following configurations.

(1) The front pipe 3 of the above configuration is formed by a tubular pipe. However, it is also possible for the front pipe to be formed by a rectangular-tube-shaped pipe or the like.

(2) In the above configuration, the erect portions 3a of the front pipe 3 are adjacent to the front side of the rod 6 with gaps therebetween. However, it is also possible to adopt a configuration in which the erect portions 3a are adjacent to (or in contact with) the front side of the rod 6 with no gaps therebetween.

(3) In the above configuration, each side panel 2 is formed as a single component in the form of a single plate. However, it is also possible to adopt, for example, a configuration in which each side panel is formed as a single panel composed of a plurality of components.

What is claimed is:

1. A frame structure of a seat cushion for a vehicular seat, comprising:
   a right plate-like side panel and a left plate-like side panel constituting side portions of the seat cushion;
   a tubular front pipe reinforcing front side portions of the right plate-like side panel and the left plate-like side panel,
   wherein the front pipe includes:
   a right erect portion and a left erect portion, the right erect portion and the left erect portion respectively extending substantially over an entire length of a front side of the right plate-like side panel and a front side of the left plate-like side panel so as to protrude above each plate-like side panel, and the right erect portion and left erect portion being oriented in a first plane, a right extending portion and a left extending portion extending forward from an upper end portion of the right erect portion and an upper end portion of the left erect portion, respectively, the right extending portion and the left extending portion being oriented in a second plane, and the first plane and the second plane being oriented substantially perpendicular to each other, and a bridge portion bridging a front end portion of the right extending portion and a front end portion of the left extending portion; and a horizontally extending rod having a longitudinal axis extending in a direction that a longitudinal axis of the bridge portion extends such that the horizontally extending rod is mounted between a front portion of the right plate-like side panel and a front portion of the left plate-like side panel.

2. The frame structure of the seat cushion for the vehicular seat as in claim 1, wherein the right erect portion and the left erect portion of the front pipe are adjacent to a front side of the rod.

3. The frame structure of the seat cushion for the vehicular seat as in claim 2, wherein a front vertically extending edge of each plate-like side panel is positioned in front of the horizontally extending rod, the vertically extending edge of the right plate-like side panel abutting the right erect portion, and the vertically extending edge of the left plate-like side panel abutting the left erect portion.

4. The frame structure of the seat cushion for the vehicular seat as in claim 1, wherein a connection member is provided between a front lower portion of each side panel and a lower portion of each erect portion of the front pipe to connect each side panel to each erect portion, the connection member including a protruding portion configured to protrude from a front side of the lower portion of the erect portion.

5. A frame structure for a vehicular seat, comprising:
a right side panel and a left side panel;
a front rod extending between a front side portion of each panel;
a rear rod extending between a back side portion of each panel;
a front pipe proximate to and in front of the front rod in a front-rear vehicular seat direction, wherein the front pipe includes:
a right side erect portion and a left side erect portion, the right side erect portion and the left side erect portion extending upward to a right side extending portion and a left side extending portion, respectively, each extending portion extending in a direction away from the front rod, the right side erect portion and left side erect portion being oriented in a first plane, the right side extending portion and the left side extending portion being oriented in a second plane, and the first plane and the second plane being oriented substantially perpendicular to each other,
a bridge portion horizontally extending between the right side extending portion and the left side extending portion;
a right side connection member and a left side connection member connecting the front pipe to the right side panel and the left side panel, respectively; and
a horizontally extending rod having a longitudinal axis extending in a direction that a longitudinal axis of the bridge portion extends such that the horizontally extending rod is mounted between a front portion of the right side panel and a front portion of the left side panel.

6. The frame structure as in claim 5, wherein each connection member includes a base portion and a protruding portion.

7. The frame structure as in claim 6, wherein each base portion is connected to a lower portion of the front side portion of the right side panel and a lower portion of the front side portion of the left side panel.

8. The frame structure as in claim 6, wherein each base portion is weld connected to a lower portion of the front side portion of the right side panel and a lower portion of the front side portion of the left side panel.

9. The frame structure as in claim 6, wherein a lower portion of the right erect portion and a lower portion of the left erect portion is connected to each protruding portion.

10. The frame structure as in claim 5, further including an elastic support body.

11. The frame structure as in claim 10, wherein the elastic support body is connected between the front pipe and the rear rod.

12. The frame structure as in claim 5, wherein a front vertically extending edge of each side panel is positioned in front of the front rod, the vertically extending edge of the right side panel abutting the right side erect portion, and the vertically extending edge of the left side panel abutting the left side erect portion.

13. A frame structure for a vehicular seat, comprising:
a right side panel and a left side panel;
a front rod extending between a front side portion of each panel;
a rear rod extending between a back side portion of each panel,
a front pipe positioned proximate to and in front of the front rod in a front-rear vehicular seat direction, wherein the front pipe is connected to each panel and includes:
a right side erect portion and a left side erect portion, the right side erect portion and the left side erect portion extending upward to a right side extending portion and a left side extending portion, respectively, each extending portion extending in a direction away from the front rod, the right side erect portion and left side erect portion being oriented in a first plane, the right side extending portion and the left side extending portion being oriented in a second plane, and the first plane and the second plane being oriented substantially perpendicular to each other;
an elastic support body is connected between the front pipe and the rear rod; and
a horizontally extending rod having a longitudinal axis extending in a direction that a longitudinal axis of the bridge portion extends such that the horizontally extending rod is mounted between a front portion of the right side panel and a front portion of the left side panel.

14. The frame structure as in claim 13, further including a right side connection member and a left side connection member connecting the front pipe to the right side panel and the left side panel, respectively.

15. The frame structure as in claim 14, wherein each connection member includes a base portion and a protruding portion.

16. The frame structure as in claim 15, wherein each base portion is connected to a lower portion of the front side portion of the right side panel and a lower portion of the front side portion of the left side panel.

17. The frame structure as in claim 15, wherein each base portion is weld connected to a lower portion of the front side portion of the right side panel and a lower portion of the front side portion of the left side panel.

18. The frame structure as in claim 15, wherein a lower portion of the right erect portion and a lower portion of the left erect portion is connected to each protruding portion.

19. The frame structure as in claim 13, wherein a front vertically extending edge of each side panel is positioned in front of the front rod, the vertically extending edge of the right side panel abutting the right side erect portion, and the vertically extending edge of the left side panel abutting the left side erect portion.

* * * * *